(12) United States Patent
Neuhard (10) Patent No.: US 8,790,027 B2
(45) Date of Patent: Jul. 29, 2014

(54) HIGH FREQUENCY RFID PRINTER

(75) Inventor: Lance D. Neuhard, New Carlisle, OH (US)

(73) Assignee: Avery Dennison Corporation, Glendale, CA (US)

( * ) Notice: Subject to any disclaimer, the term of this patent is extended or adjusted under 35 U.S.C. 154(b) by 2175 days.

(21) Appl. No.: 11/726,259

(22) Filed: Mar. 21, 2007

(65) Prior Publication Data

US 2008/0232894 A1    Sep. 25, 2008

(51) Int. Cl.
  *B41J 15/00*    (2006.01)
(52) U.S. Cl.
  USPC .......................................... 400/611; 399/384
(58) Field of Classification Search
  USPC .................. 400/611; 235/449; 399/384
  See application file for complete search history.

(56) References Cited

U.S. PATENT DOCUMENTS

| | | | |
|---|---|---|---|
| 2,762,020 A * | 9/1956 | Gordon | 336/110 |
| 4,742,470 A * | 5/1988 | Juengel | 700/175 |
| 5,833,377 A | 11/1998 | Keller et al. | |
| 6,848,616 B2 * | 2/2005 | Tsirline et al. | 235/449 |
| 7,298,266 B2 * | 11/2007 | Forster | 340/572.1 |
| 7,522,055 B2 * | 4/2009 | Carrender et al. | 340/572.1 |
| 2001/0048028 A1 | 12/2001 | Sasaki et al. | |
| 2005/0280537 A1 | 12/2005 | Feltz et al. | |
| 2006/0001526 A1 | 1/2006 | Murofushi et al. | |
| 2006/0237536 A1 | 10/2006 | Shiigi et al. | |
| 2007/0013520 A1 | 1/2007 | Conwell et al. | |

FOREIGN PATENT DOCUMENTS

EP    1610255    12/2005

OTHER PUBLICATIONS

Coilcraft, Inc., SMT Power Inductors—DS5022P Series, Document 188-1 Revised Dec. 5, 2006, Copyright 2006.
Johnson Components, MMCX Straight PC Mount Jack Receptacle; 2 pages.
Texas Instruments, Tag-it HF-I Transponder Inlays, Reference Guide 11-09-21053 May 2002.

* cited by examiner

*Primary Examiner* — Matthew G Marini
(74) *Attorney, Agent, or Firm* — Avery Dennison Corporation (57) ABSTRACT

There is disclosed a printer having a print head and a high frequency magnetic coupler to magnetically couple with high frequency RFID transponders in a web at or near the print head. The coupler couples magnetically to only one transponder at a time that is generally aligned with one or more inductors, and magnetic radiation from the inductor(s) may be at least partly shielded from upstream transponders, and a ground conductor in the upstream side of the coupler diminishes radiation to upstream transponders.

13 Claims, 9 Drawing Sheets

HIGH FREQUENCY RFID PRINTER

BACKGROUND

1. Field

The field is RFID printers.

2. Brief Description of the Prior Art

The following prior art is made of record: U.S. Pat. Nos. 5,833,377; 6,848,616; Publication No. US2005/0280537; Coilcraft, Inc. SMT Power Inductors —DS5022 P Series, Document 188-1 Copyright 2006; Johnson Components MMCX Straight PC Mount Jack Receptacle, 2 pages; and Texas Instruments Tag-it HF-I Transponder Inlays Reference Guide 11-09-21-053 May 2002.

SUMMARY

An embodiment of the invention includes a printer with a print head, a web path for a longitudinally extending web of record members having longitudinally spaced high frequency RFID transponders, the web path extending in a downstream direction to the print head, and a high frequency magnetic coupler disposed along the web path, the coupler being capable of magnetically coupling with the transponders by writing to and/or reading the transponders one-at-a-time, the coupler including at least one inductor capable of radiating or receiving magnetic energy, each inductor having a magnetizable core and an energizable winding surrounding the core, and the coupler being disposed to radiate or receive magnetic energy at a level to write to or read a transponder in the web generally aligned with the core but insufficient to write to or read any transponder in the web not generally aligned with at least one core. It is preferred that at least one grounded conductor be positioned upstream of the core(s) to diminish magnetic radiation to transponders upstream of the conductor(s). It is also preferred to provide a plurality of inductors disposed generally transversely across the web path. When a plurality of inductors are used, they are preferably connected in series and mounted on a circuit board and the windings of the inductors are wound in the same direction. The coupler is preferably positioned near the print head such as between a guide member and the print head, however, the coupler can be positioned on the print head or on the substrate for the print head.

DETAILED DESCRIPTION OF THE PREFERRED EMBODIMENTS

Figure 1:
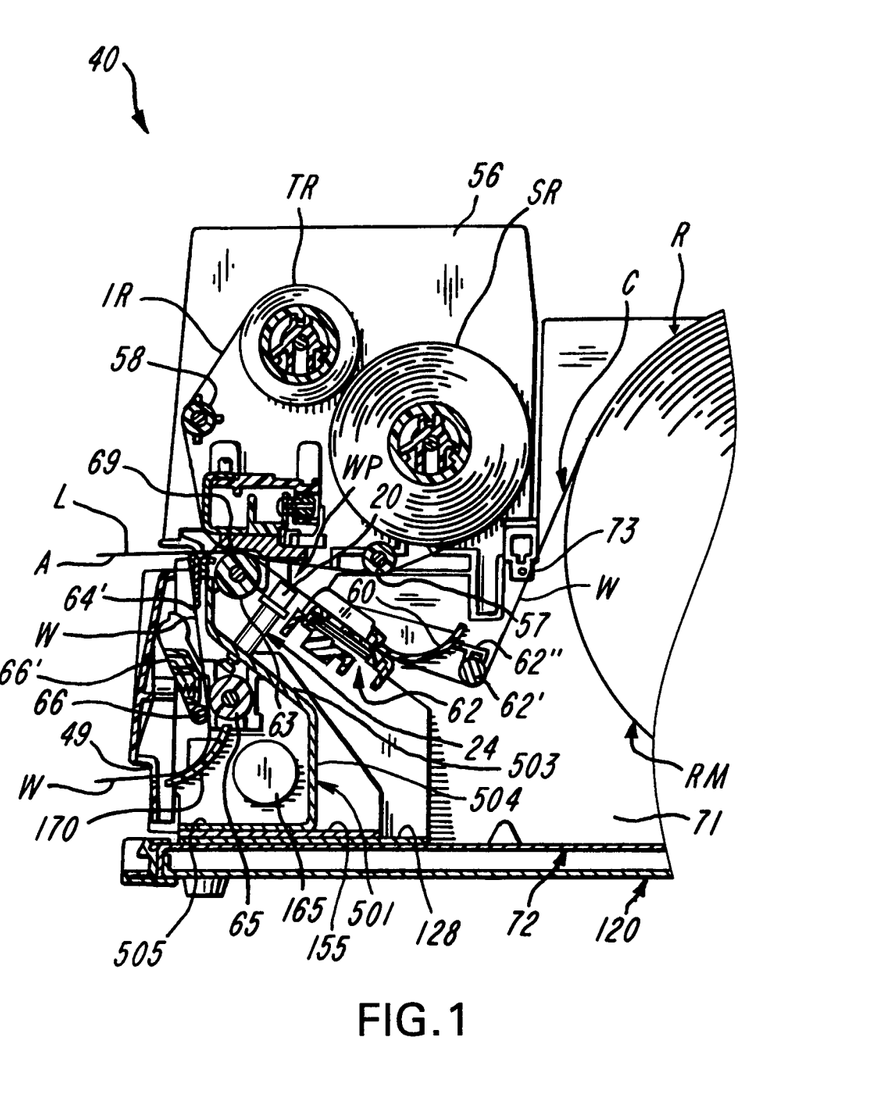
FIG. 1 is a side elevational view of an embodiment of a printer.

With reference initially to FIG. 1, there is shown a printer generally indicated at 40 which is the same in many respects to the printer 40 disclosed in U.S. Pat. No. 5,833,377 and the printer 40 disclosed in patent application U.S. Publication No. US2005/0280537, the disclosures of both of which are incorporated by reference in their entireties. The printer 40 of the present application differs in certain respects from the printers of U.S. Pat. No. 5,833,377 and Publication No. US 2005/0280537 as will be apparent from the description and drawings of the present application. For example, the printer disclosed in U.S. Pat. No. 5,833,377 is not disclosed as having RFID reading and/or writing capabilities, while the printer disclosed in U.S. Publication No. 2005/0280537 has electromagnetic ultra high frequency (UHF) RFID reading and/or writing capabilities.

While the embodiment of the present application is illustrated in connection with a thermal printer using dot heating elements to create images such as bar codes, graphics, alphanumeric characters and the like, it is also useful with printers such as ink jet, laser, xerographic, impact and other types of printers.

Figure 2:
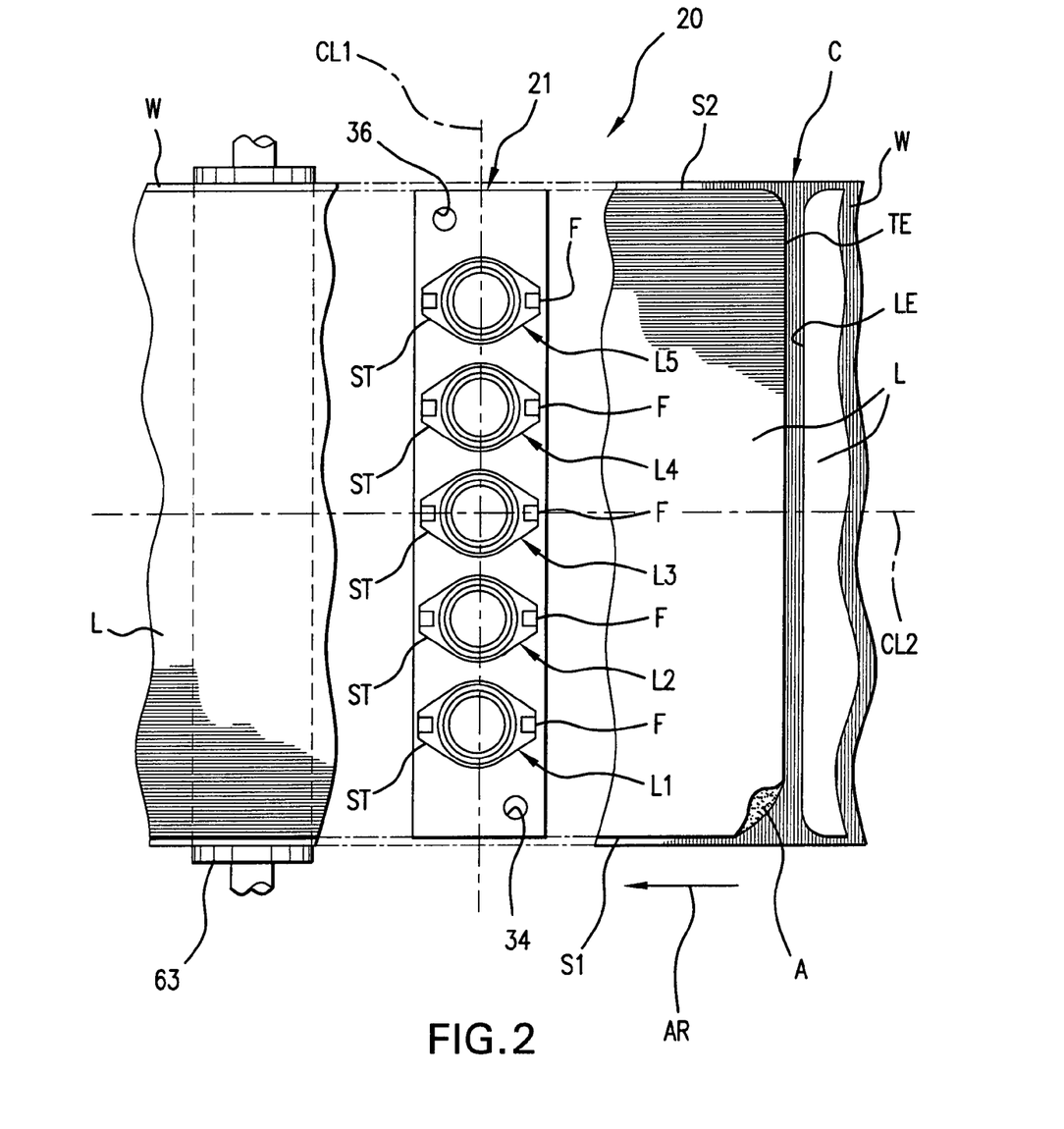
FIG. 2 is a top plan view of a fragmentary portion of the printer as viewed perpendicular to the web path illustrated in FIGS. 1 and 4.

The printer 40 of the present application can have a generally vertical, electrically conductive, metal frame plate 71 and an electrically conductive metal base plate 120. A movable mounting member 56 is pivotally mounted to the frame plate 71 about hinge blocks 73 (only one of which is shown). A roll R can be mounted on a suitable mounting member as shown for example in U.S. Pat. No. 5,833,377 and Publication No. US2005/02805037. The roll R can comprise a web C of record members RM. The record members RM are illustrated to comprise the web C which can include a carrier web W coated with a release coating R' to which a series of pressure sensitive labels L can be releasably adhered by tacky or pressure sensitive adhesive A (FIG. 2). If desired, the web C of record members RM can be comprised of a web of RFID tags or RFID forms. The web C is shown to be paid out of the roll R and can pass beneath a guide roller 62' rotatably mounted by a bracket 62" to beneath a guide member 60 which is part of a web guide generally indicated at 62. Any suitable web guide, for example, just a member or members with one or more guide surfaces or a roller or rollers can be used instead, if desired. The nature of the web guiding is not critical. The web C passes downstream from a high frequency (HF) magnetic coupler 20 toward a print head 69 along a web path WP. The positioning of the roller R and the roller 62' do not affect the web path WP, however, the guide member 60 assures that the taut web C remains optimally located with respect to the coupler 20. The web path WP extends between the guide member 60 or any other suitable guide and the print head 69. The coupler 20 is preferably near or close to the print head 69. The coupler can instead be on the print head 64 or on the substrate for the print head 69. The web C is illustrated to pass between the print head 69 and platen roll 63. A delaminator 64' in the form of a peel bar 64' is provided downstream of the guide member 60 and preferably adjacent the nip between the print head 69 and the platen roll 63. However, the delaminator 64' can alternatively comprise a peel roller (not shown). A label L can be delaminated at the delaminator 64' where the carrier web W makes an abrupt change in direction and is advanced downwardly by a motor 165 between a motor-driven roll 65 and a spring-urged back-up roll 66. A spring 66' is used to urge the back-up roll 66 toward the roll 65 so that the web W is pressed between the rolls 65 and 66. From there the carrier web W passes about an accurate guide plate 170 and through an exit opening 49.

The illustrated printer 40 can use an ink ribbon IR wound into a supply roll SR. The ink ribbon IR can be paid out of the supply roll SR and can pass beneath a ribbon guide 57 to the nip between the print head 69 and the platen roll 63 and from there the ink ribbon IR can pass partially about a guide 58 and onto a driven take-up roll TR.

The magnetic coupler 20 is shown to be mounted on an electrically conductive shield 501. The shield 501 also mounts the delaminator 64' which is better shown for example in Pub. No. US 2005/0280537. The shield 501 includes a vertical portion 504 and an inclined portion 503 which mounts the coupler 20. The shield 501 is electrically grounded to the base plate 120 which is in turn electrically grounded.

With reference to FIG. 2, there is shown the web C illustrated to include the carrier web W to which labels L are releasably adhered by the adhesive A. The label L can contain high frequency (HF) magnetic RFID transponders T not shown in FIG. 2 for clarity but diagrammatically illustrated in FIGS. 3, 4 and 7. The web C is broken away in FIG. 2 to show an embodiment of the coupler 20 which underlies the web C. FIG. 2 shows the inductors L1, L 2, L 3, L 4 and L5 mounted on a printed circuit board 21, without showing various conductive traces of the circuit board 21 for clarity. Such conductive traces are, however, shown in FIGS. 5, 6, 6A and 11. A transversely extending centerline CL1 of one of the labels L is shown. The centerline CL1 is illustrated to be midway between leading and trailing edges LE and TE of the labels L. A longitudinally extending centerline CL2 of the web C is also shown. The centerline CL2 extends midway between side edges S1 and S2 of the labels L. The centerlines CL1 and CL2 of the labels L are also the centerlines of the high frequency magnetic transponder T in the embodiment shown in FIG. 2.

Figure 3:
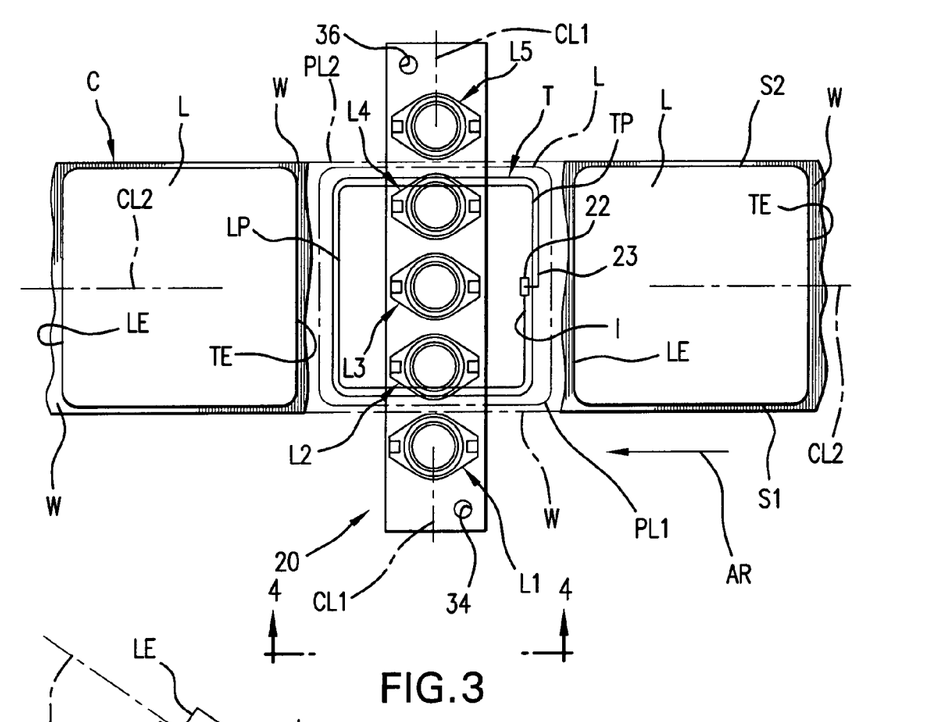
FIG. 3 is a top plan view showing the magnetic coupler in relation to a narrow web of high frequency RFID transponders.

FIG. 3 is a view similar to FIG. 2 but showing two labels L in full lines and the intervening label L in phantom lines PL1 and the carrier web W in phantom lines PL2 for clarity. The transponder T is illustrated by solid lines in the centrally located label L which overlies the coupler 20. The web C passes from right to left in the downstream direction of the arrow AR in FIGS. 2 through 4 toward the print head 69. As shown in the drawings, the magnetic coupler 20 is positioned upstream of the print head 69 along with web path WP and, stated differently, the print head 69 is downstream of the coupler 20 along the web path WP.

In FIG. 3, the transponder T is shown to have an RFID chip or inlay 22 connected to the ends of winding 23. The transponder T is shown to be centered transversely with respect to the label L, and the label L and the transponder T are shown centered transversely with respect to the coupler 20. The inductors L1 through L5 are shown in FIG. 3 to be centered on the circuit board 21 both transversely and longitudinally of the web C. The centerline CL1 is shown to pass through the centers of the inductors L1 through L5 and the centerline CL2 passes through the center of the inductor L3. In FIG. 3 the web C is shown to be narrower than in FIG. 2 so only three indicators L2, L3 and L4 are within the inner periphery I of the transponder T.

Figure 4:
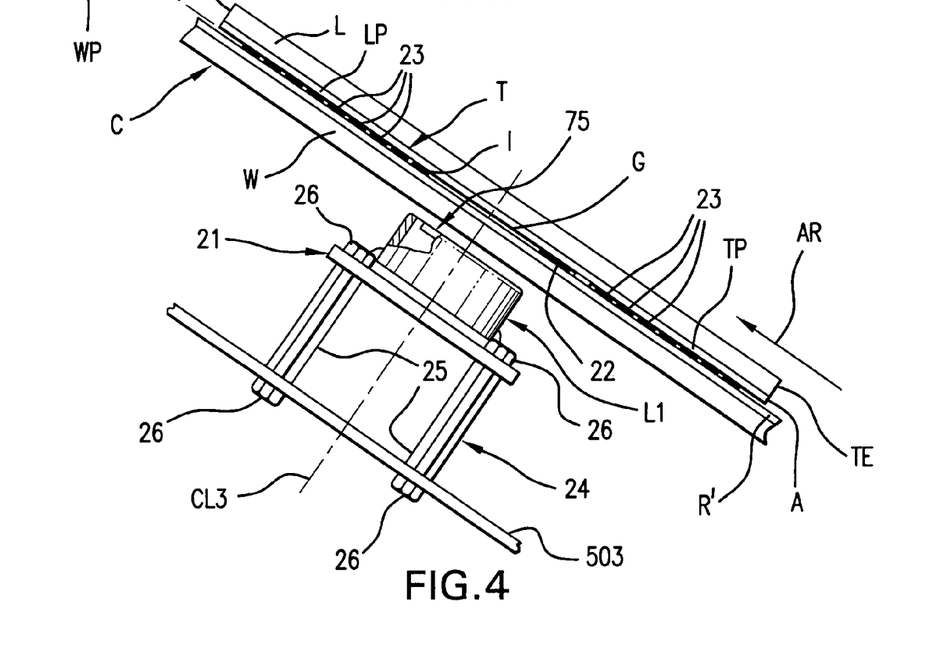
FIG. 4 is a side elevational view of the magnetic coupler mounted to the printer in relation to a web of RFID transponders.

FIG. 4 is an enlarged elevational view taken along line 4-4 of FIG. 3, but showing the web C in section for clarity. The transponder T is shown to have many more turns in FIG. 4 than in FIG. 3. A lesser number of turns of the winding 23 is shown in FIG. 3 for clarity to avoid excessive crossing of lines. In FIG. 4 the inductors L1 through L5 are shown to be aligned with a gap G within the inner periphery I of the winding 23. However, it is preferred that the writing to or reading of the transponder T be done at the leading or trailing portions LP or TP of the winding 23 where the centerline CL1 is aligned with the leading portion LP or the trailing portion TP. However, the writing to or reading can be done at the center of the gap G, but this is not the most preferred location. One or more of the inductors L1 through L5 is particularly effective in writing to and/or reading data from the transponders T one-at-a-time. When energized by a signal, the coupler 20 causes a magnetic field to extend along the centerline CL3 as viewed in FIG. 4 in a torodial pattern to cause the transponder T which is aligned with the coupler 20 to be written to. Conversely, the transponder T retransmits magnetic energy along the centerline CL3 to cause one or more of the inductors L1 through L5 to read the data from the transponders. The web C can either be stationary or moving when the writing to or reading occurs.

FIG. 4 shows the circuit board 21 secured to the inclined portion 503 by a stand-off generally indicated at 24. The stand-off 24 may comprise a pair of electrically conductive hex-shaped rods 25 secured by electrically conductive screws 26 to the circuit board 21 and to the inclined portion 503.

Figure 5:
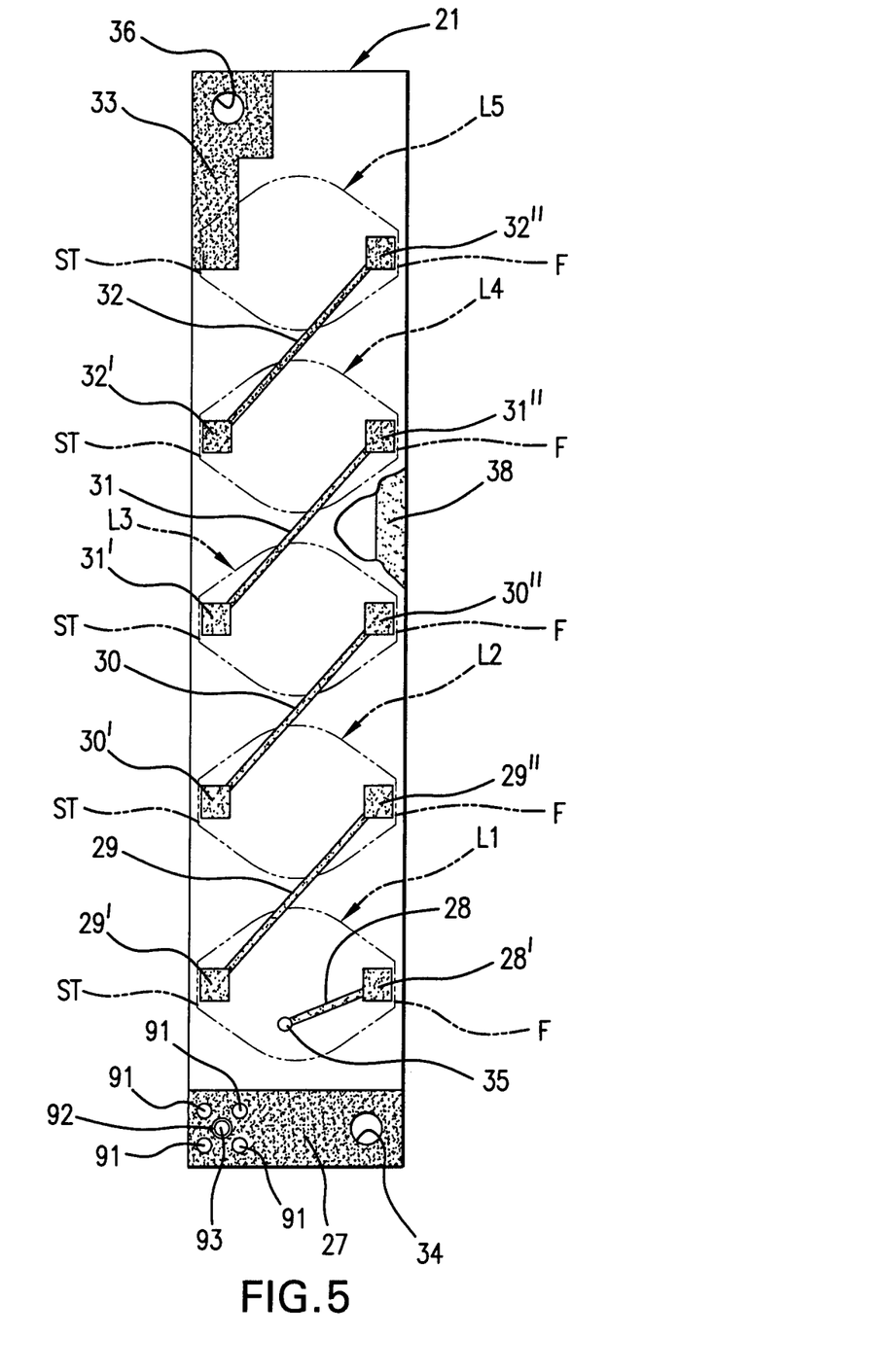
FIG. 5 is a top plan view of a printed circuit board showing various connections.

With reference to FIG. 5, there is shown the top of the circuit board printed with conductive traces 27 through 33. The inductors L1 through L5 are shown in phantom lines as they would appear over electrically conductive traces 27 through 33. Specifically, the inductor L1 is connected to enlargement 28' on the trace 28 and to enlargement 29' of the trace 29; the inductor L2 is connected to enlargement 29" of the conductive trace 29 and to enlargement 30' of the trace 30; the inductor L3 is connected to enlargement 30" of the trace 30 and to enlargement 31' of the trace 31'; the inductor L4 is connected to enlargement 32' of the trace 32 and to enlargement 32" of the trace 32; and inductor L5 is connected to enlargement 32" and to the trace 33. The traces 27, 28 and 33 are connected to respective plated-through holes 34, 35 and 36. The plated through-hole 35 is electrically connected to an electrically conductive trace 41 (FIG. 6A) at the plated through-hole 35. Two of the four screws 26 extend through the holes 34 and 36 and clamp against conductive areas 27 and 33, so that the conductive areas 27 and 36, the screws 26 of the standoff 24, the shield 501 and the base plate 120 are all electronically connected and grounded.

It is preferred that the inductors L1 through L5 be arranged with their start ends ST and finish ends F in alignment so that the start end of one inductor be connected to the finish end F of the adjacent inductor. For example, the start end ST of the inductor L1 is connected to the finish end F of the inducator L2, and the start end 57 of the inductor L2 is connected to the finish end F of the inductor L3, and so on. The finish ends F are most preferably aligned with the conductor 38 and on opposite sides of the printed circuit board 21, as shown.

Figures 6, 6A:
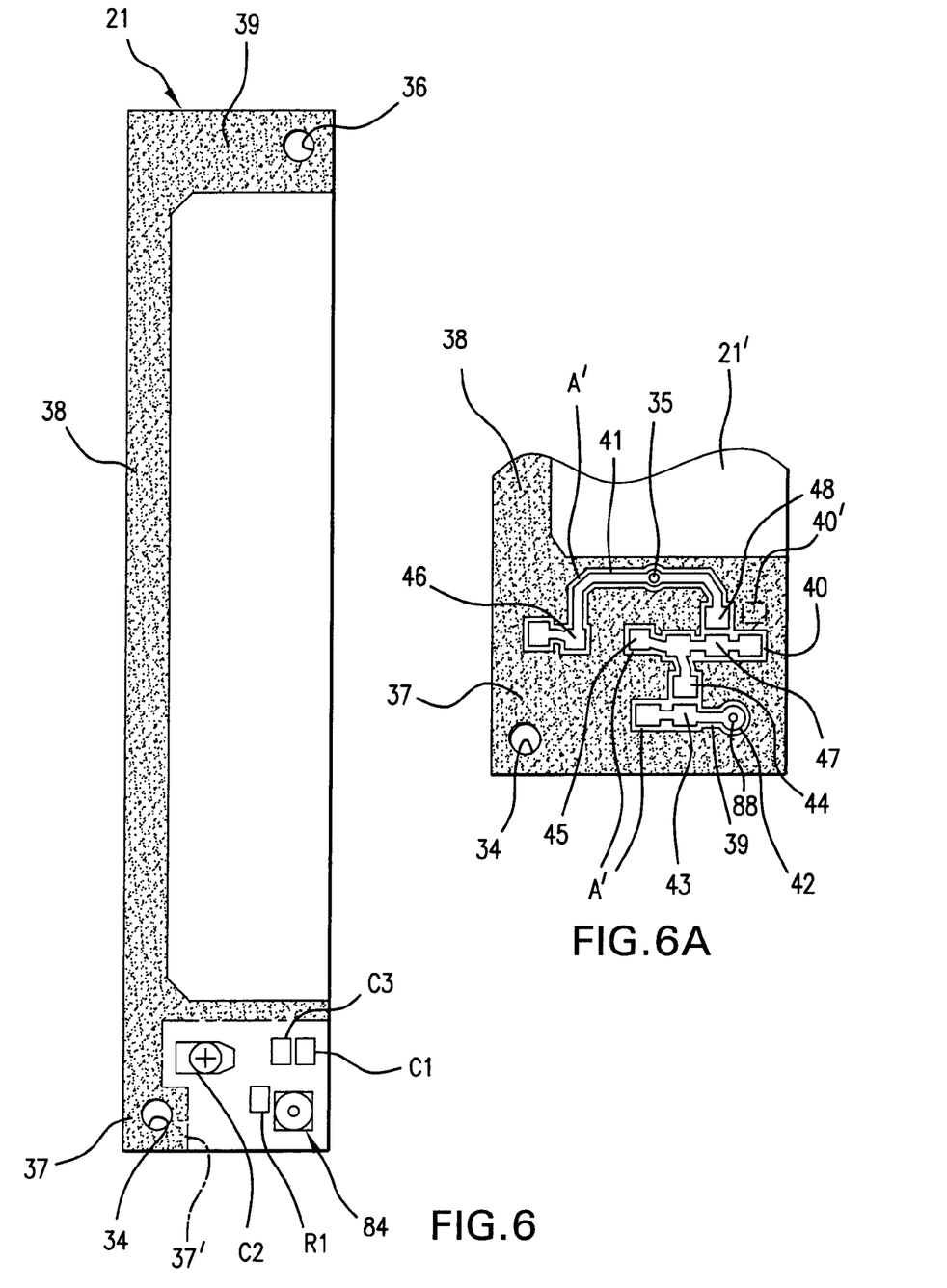
FIG. 6 is a bottom plan view of the circuit board shown in FIG. 5.
FIG. 6A is a fragmentary bottom plan view showing a portion of the printed circuit board.
Figure 12:
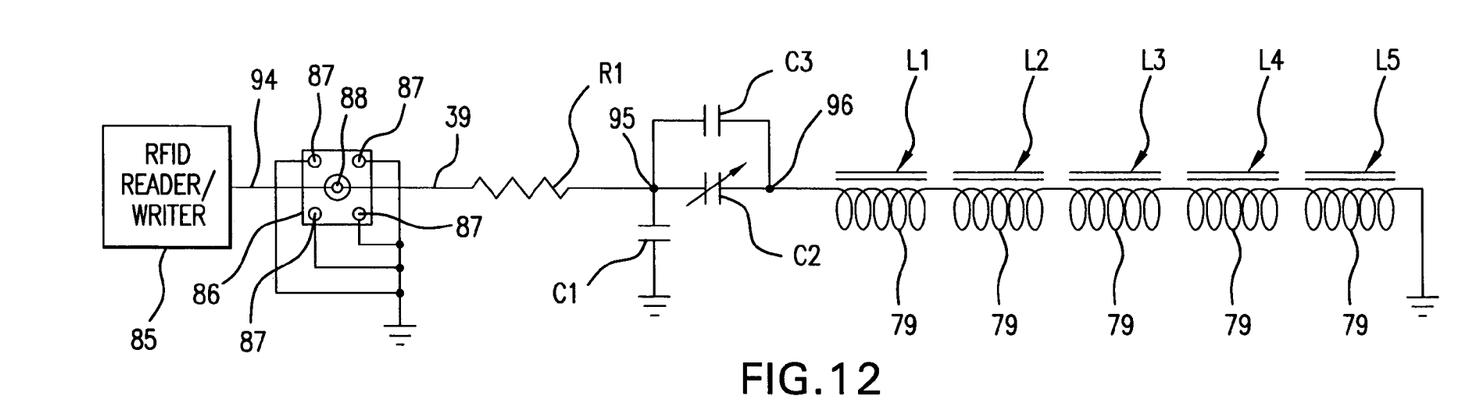
FIG. 12 is a circuit diagram of a high frequency RFID reader/writer and a magnetic coupler with multiple inductors.

FIG. 6 shows the bottom or underside of the printed circuit board 21 and connected electrically conductive areas 37 and 39 and a conductor 38 integral with the conductive areas 37 and 39. While the conductor 38 is shown to be an electrically conductive trace as are the areas 37 and 39, the conductor 38 can be a wire, or wires, or one or more webs or stripes. The trace 38 may be relatively wide and is disposed at least at the upstream side of the inductors L1 through L5. A zone 37' bounded by a phantom line within the trace 37 is shown to have components R1, C1, C2, C3 and a connector CN1 mounted in it. These components are also shown in FIG. 12. The zone 37' contains both conductive and non-conductive areas which enable connections of these components to each other and in turn to the inductor L1. FIG. 6A shows the connections in the zone 37'. Stippling to show conductive portions within the zone 37' has been omitted in FIG. 6 for clarity.

FIG. 6A shows the construction of the underside of the circuit board 21 at the conductive area 37. Portions of the area or trace 37 are stripped away at gaps A' to form electrically conductive traces 39, 40 and 41. The signal enters the trace 39 at pin 88 at portion 42. The resistor R1 is connected to portions 43 and 44. The capacitor C1 is connected to conductive portion 40 and to the conductive area portion 40' of the conductive area 37 (which is at ground). The capacitor C2 is connected to conductive portions 45 and 46. The capacitor C3 is connected to conductive portions 47 and 48. The portions 42 and 43 are part of the trace 39, the portions 44, 45 and 47 are part of the trace 40, and the portions 46 and 48 are part of the trace 41. All the traces 39, 40 and 41 are electrically isolated from the conductive area 37 by a non-conductive gaps or non-conductive areas A'.

Figure 7:
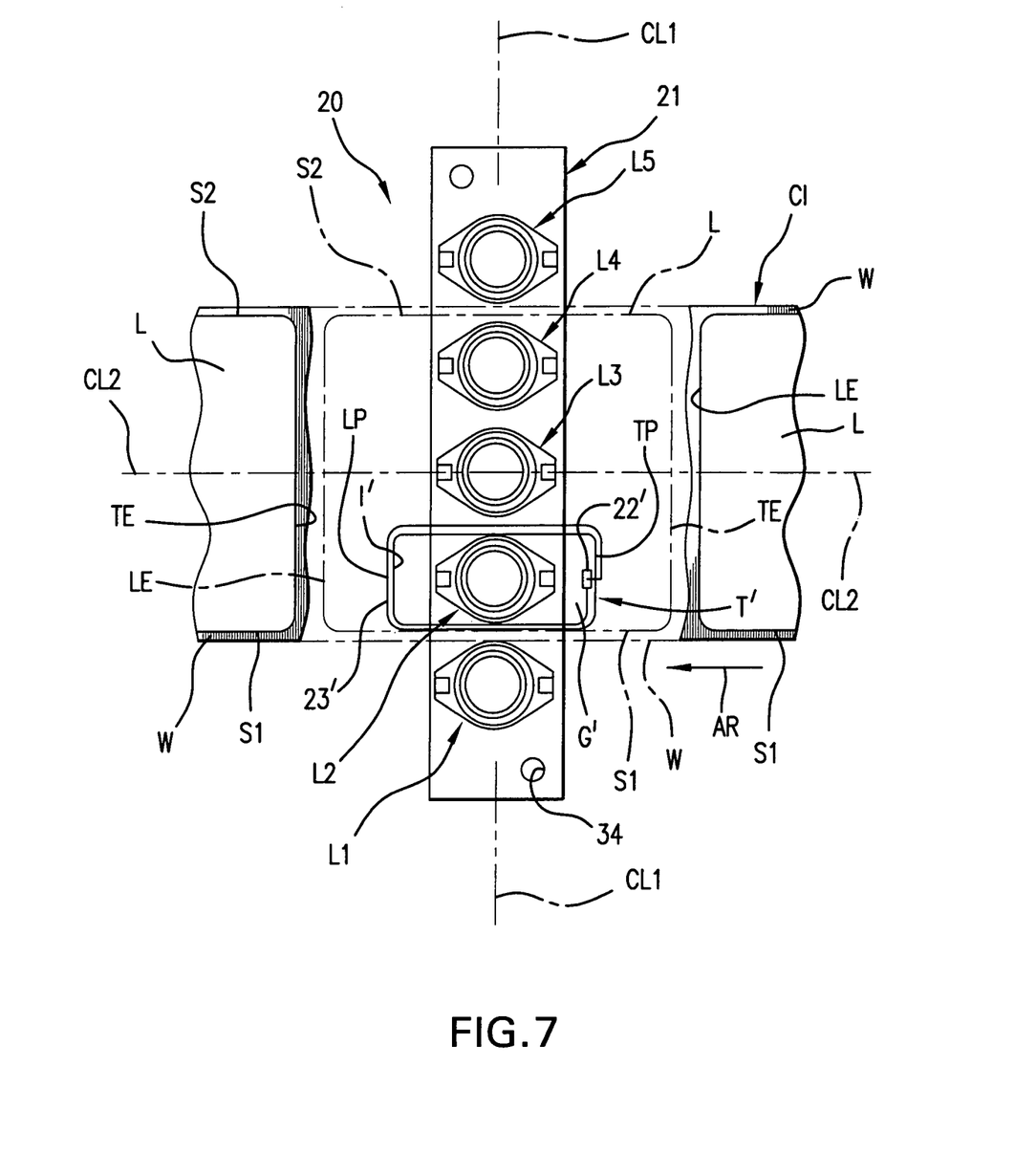
FIG. 7 is a top plan view similar to FIG. 3 showing the RFID transponder offset from the centerline of the web of record members.

With reference to FIG. 7, there is shown a web C1 with a carrier web W, with each label L containing a high frequency (HF) magnetic transponder T'. It is to be noted that the transponder T' is offset from the centerline CL2 and is elongate in the direction of the web path WP. In particular, the longitudinal dimension of the transponder T' is greater than its transverse dimension with respect to the web C. In other respects the transponder T' is similar to the transponder T in that it has a winding 23' connected at its end to an RFID chip 22'. In that the transponder T' is offset, it is only the inductor L2 that is aligned with the transponder T'. Nevertheless, the inductor L2 writes to or reads the transponder T' even though magnetic coupling is weaker between the transponders T' and the inductors L1 and L3 through L5.

Figure 8:
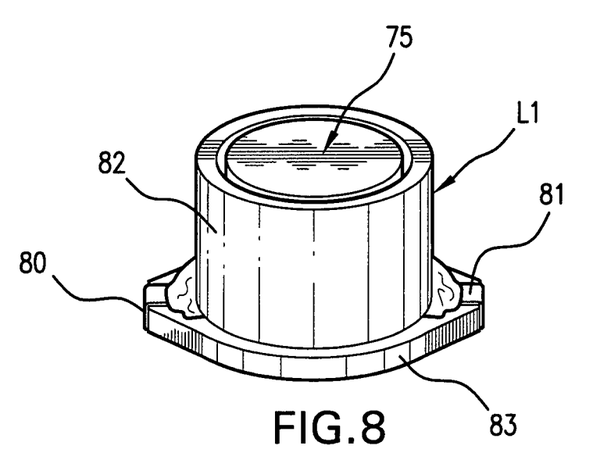
FIG. 8 is a pictorial view of an inductor used in the magnetic coupler.
Figure 9:
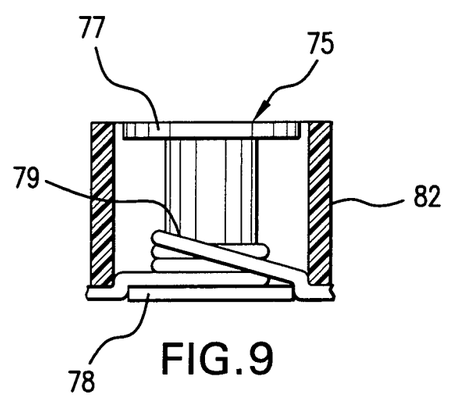
FIG. 9 is a fragmentary view of magnetizable parts and a winding of an inductor.

With reference to FIGS. 8 and 9, there is shown an inductor, for example L1, having a core 75. The inductors L1 through L5 are preferably identical. The core 75 is shown to have a central core portion 76 integrally molded with end plates 77 and 78. A winding 79 is wrapped about the core portion 76 between the end plates 77 and 78. In the illustrated embodiment the winding 79 makes three and a half (3-1;2) turns and is connected at its opposite ends to electrically conductive connectors 80 and 81. The end plate 78 and a magnetic field limiter or shield 82 can be adhesively or otherwise suitably secured to a base 83 (not shown in FIG. 9). The shield 82 and end plates 77 and 78 are shown to be circular cylindrical. The core 75 and the shield 82 can be composed of a suitable magnetizable material such as ferrite. It is noted that the core 75 and in particular end plates 77 and 78 as well as the winding 79 are spaced from the shield 82 to provide an air gap. The shield 82 limits the magnetic radiation from and to the core 75 so that transponders T or T' upstream and downstream are not written to or read. The shield 82 does not shield, interfere with or limit magnetic radiation between the cores 75 and the transponder T (or T') being written to or read. Rather, the shield 82 allows the magnetic radiation from the cores 75 to pass to and from the transponder T (or T') which is in alignment with the cores 75.

The inductors L1 through L5, or any one of them, can write to and/or read any transponders positioned at a selected transverse position across the web C. While the inductors L1 through L5 write to and/or read an HF RFID transponder T or T' with or without the shield 82, use of the shield 82 helps limit or confine magnetic energy to the region of the core or cores 75.

It is noted from FIGS. 5 and 6 that the conductor 38 is at the upstream side of the inductors L1 through L5. The conductor 38 is effective to diminish the radiation from and to the inductors L1 through L5 from transponders T and T' located upstream of the conductor 38. So while the writing and/or reading function can be preformed with or without the shield 82 and/or the conductor 38, use of either one is preferred and use of both the shield 82 and the conductor 38 is most preferred.

Figure 10:
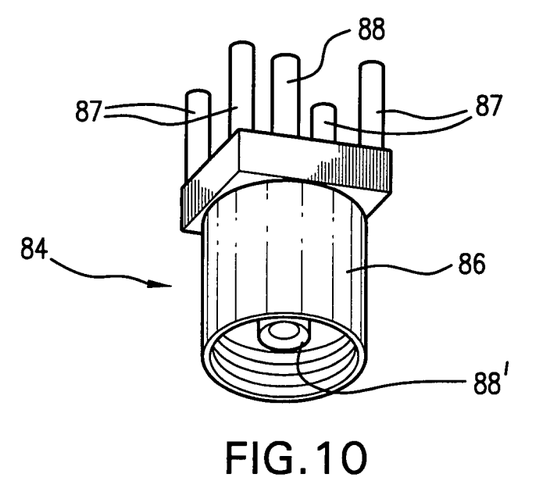
FIG. 10 is a pictorial view of a connector used on the circuit board.

With reference to FIG. 10, a connector 84 is used to connect a conductor from an RFID reader/writer 85 (FIG. 12) to circuit board 21. The connector 84 includes a generally tubular body 86 having four posts 87. An electrically conductive pin 88 extends through the body 86 and projects through an insulator 89 to a position centrally between the posts 87. The pin 88 includes a connector portion 88' for connection to the RFID reader/writer 85. The posts 87 extend through the holes 90 in the electrically insulating body 21' of the circuit board 21. The posts 87 are soldered at 91 to the conductive area 37. The pin 91 is anchored to the body 21' by solder 92 at a non-conductive area 93. The body 86 is soldered to the conductive trace 39 at the area 42.

Figure 11:
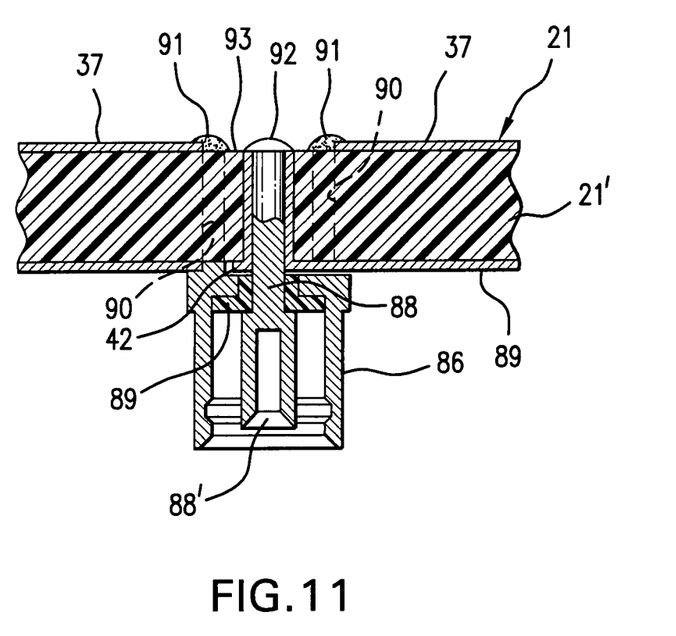
FIG. 11 is a fragmentary sectional view of the circuit board and the connector.

With reference to FIGS. 11 and 12, the reader/writer 85 is connected via conductor 94 to the connector portion 88' of the pin 88. The connector body 86 and its pins 87 are grounded. The pin 88 is connected to the trace 39 which is connected to the resistor R1 which can have a resistance of zero ohm. The capacitors C2 and C3 are connected in parallel to nodes 95 and 96. The capacitor C1 is connected to the node 95 and to ground. The windings 79 of the inductors L1 through L5 are connected in series. The winding 79 of the inductor L1 is connected to the node 96 and the winding 79 of the inductor L5 is connected to ground. The capacitor C2 is a variable capacitor which can be manually adjusted. The arrangement of capacitors C1, C2 and C3 is used to tune in the signal so that the high-frequency magnetic coupler operates at a preferred standard of 13.56 MHz. It is apparent that the coupler 20 can be made to operate at other frequencies in the high-frequency range which typically is between 3 and 30 MHz. The transponder T receives forward link commands from the RFID reader/writer 85 using amplitude shift keying modulation of the 13.56 MHz RF signal. The transponders T and T' transmit reverse link data using backscatter modulation.

Figure 13:
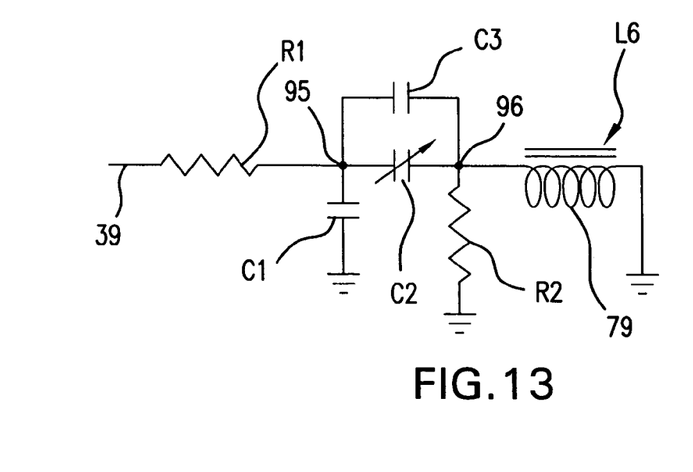
FIG. 13 is a circuit diagram of a magnetic coupler with a single inductor.

FIG. 13 is a fragmentary view similar to a portion of FIG. 12, and can be used when a single inductor L6 is used. The inductor L6 is connected to the node 96 and to ground. A resistor R2 is connected to the node 96 and to ground.

By way of example, not limitation, a typical inductor usable in an embodiment is sold by Coilcraft, located in Cary, Ill., USA under part number DS5022P-102ML with an L of 1.0 uH, a DCR (direct current resistance) max of 0.016 ohms, an SRF (self resonant frequency) type of 130, an Insut (saturation current) of 18.0 Amps and an Irms (route mean square current) of 6.5 Amps. It has overall dimensions of 18.03 and 15.24 mm. The longer dimension extends in the longitudinal dimension of the web path WP and the shorter dimension extends transverse to the web path WP. The short dimension of printed circuit board 21 may be 18 mm and may extend in the direction of the web path WP and the long dimension of the printed circuit board may be about 102 mm. The center-to-center spacing of adjacent inductors may be 17 mm. These dimensions are not critical, but are preferred in the illustrative embodiment. The spacing of the inductors is such that transponders T (or T') can be read at different locations across the web C (or C1) by the coupler 20.

By way of further example, not limitation, the connector 84 may be the MMCX Straight pc mount jack receptacle type of Johnson Components, Waseca, Minn., USA, sold under part no. 135-3701-201. Any suitable inductors, connectors and components may be used other than the ones disclosed above.

The cores 75 of the inductors L1 through L5 and L6 are shown to be close to the transponders T and T' in web C as is preferred. By way of example, not limitation, the distance of the cores 79 to the web C can be most preferably about 6 mm in the illustrative embodiment.

Typical high-frequency transponders are disclosed in Tag-it HF-I Transponder Inlays Reference Guide, 11-09-21-053, May 2002 of Texas Instruments, Dallas, Tex., USA.

Other embodiments and modifications of the invention will suggest themselves to those skilled in the art, and all such of these as come within the spirit of this invention are included within its scope as best defined by the appended claims.

I claim:

1. A printer comprising:
   a print head,
   a single web path for a longitudinally extending web of record members having longitudinally spaced high frequency RFID transponders, the web path extending in a downstream direction to the print head, and
   a high frequency magnetic coupler disposed along the web path, the coupler being capable of magnetically coupling with the transponders by writing to and/or reading the transponders one-at-a-time, the coupler including at least one inductor capable of radiating or receiving magnetic energy,
   each inductor having a magnetizable core and an energizable winding surrounding the core, and the coupler being disposed to radiate or receive magnetic energy at a level to write to or read a transponder in the web generally aligned with 'the core but insufficient to write to or read any transponder in the web not generally aligned with at least one core; and
   wherein the printer has a cylindrical magnetizable shield surrounding each core and its winding to shield magnetic radiation to RFID transponders upstream of the shield(s).

2. A printer as defined in claim 1, including a magnetizable shield adjacent the core(s) and the respective winding(s) to shield magnetic radiation to RFID transponders upstream and/or downstream of the coupler.

3. A printer as defined in claim 1, including at least one grounded conductor upstream of the core(s) to diminish magnetic radiation to transponders upstream of the conductor(s).

4. A printer as defined in claim 1, including
   a shield adjacent each core and the respective winding, and
   a grounded conductor extending transversely of the path and disposed at an upstream position relative to the core(s) to diminish magnetic radiation to transponders upstream of the core(s).

5. A printer as defined in claim 1, wherein each core comprises
   a central elongate core portion,
   an end plate joined to each end of the core portion, the winding being wrapped about the central core portion between the end plates.

6. A printer as defined in claim 1, wherein the coupler includes a plurality of the inductors extending in a direction transverse to the web path.

7. A printer as defined in claim 1, wherein the coupler includes a plurality of the inductors extending in a direction transverse to the web path, and
   at least one grounded conductor extending in a direction transversely across the web path at an upstream position relative to the inductors to diminish magnetic radiation to RFID transponders upstream of the conductor(s).

8. A printer as defined in claim 1, wherein the coupler includes a plurality of inductors connected in series.

9. A printer as defined in claim 8, wherein the inductors are mounted on a circuit board.

10. A printer as defined in claim 1, wherein the core(s) extending along a line generally perpendicular to the web path.

11. A printer as defined in claim 1, a circuit board to mount the inductor(s), the circuit board having a grounded conductive trace on the upstream side of the inductor(s).

12. A printer as defined in claim 11, wherein the grounded trace is at least co-extensive in length with the span of the inductors.

13. A printer as defined in claim 1,
   a circuit board extending transversely to the web path, wherein the coupler includes a plurality of transversely spaced inductors disposed across the web path and mounted to the circuit board, and the circuit board having a grounded. conductive trace separate from the inductors extending substantially across the width of the web path at the upstream side of the inductors.

* * * * *